United States Patent Office 3,803,333
Patented Apr. 9, 1974

3,803,333
FLUFFY FROSTING COMPOSITIONS
Richard Morris Roudebush, Cincinnati, Ohio, assignor to The Procter & Gamble Company, Cincinnati, Ohio
No Drawing. Continuation-in-part of abandoned application Ser. No. 128,156, Mar. 25, 1971. This application Oct. 30, 1972, Ser. No. 302,321
Int. Cl. A23g 3/00
U.S. Cl. 426—163
5 Claims

ABSTRACT OF THE DISCLOSURE

Fluffy frosting compositions (in the form of a dry mix or finished product) containing fatty acid esters of polyglycerol and which exhibit excellent heat stability characteristics can be produced by using polyglycerol esters comprising more than 50% stearate with the remainder being palmitate.

CROSS REFERENCE

This application is a continuation-in-part of commonly assigned co-pending application Ser. No. 128,156, filed Mar. 25, 1971, now abandoned.

This field of this invention is food products. More specifically, the invention relates to edible toppings known as fluffy frostings. Fluffy frostings are uncooked, generally shortening-free, aqueous, compositions which are used as toppings on cakes, cupcakes, and other desserts. Fluffy frostings are normally light and highly aerated. They have a unique and desirable mouthfeel and eating quality provided by the high level of aeration (combined usually with the absence of shortening) and therefore these products are highly favored by consumers as a topping or filling for baked items, ice cream, candy, and the like.

Fluffy frostings conventionally consist predominantly of sugar and water and also must contain a foaming/aerating agent. If prepared in the home, fluffy frosting almost always utilize egg white as the foaming/aerating agent. Dry mixes which can be whipped into a fluffy frosting upon the addition of water are commercially available. These products generally utilize egg albumen or a similar protein source as the foaming/aerating agent, and they also contain a stabilizer for the foam which is usually a gum-type material such as algin, gelatin, or a cellulose derivative such as carboxymethylcellulose.

A primary disadvantage possessed by conventional fluffy frostings is their instability over a period of time. A further disadvantage possessed by conventional fluffy frostings is the fact that the protein foaming/aerating agent is generally a very expensive ingredient and is susceptible to microbiological attack. To solve the above problems, it was discovered that certain polyglycerol esters of fatty acids could be utilized as the foaming/aerating agent in fluffy frostings. Commonly assigned, co-pending application, Ser. No. 711,862, filed Mar. 11, 1968, discloses frostings containing polyglycerol esters which can be highly aerated and are so exceptionally stable that they do not require a stabilizer.

In addition to the above-described problems, polyglycerol ester fluffy frostings tend to exhibit unsatisfactory heat stability characteristics. Previously, it was felt that the only way to obtain good heat stability characteristics in polyglycerol ester fluffy frosting compositions was to use a substantial amount of behenic acid or another fatty acid having at least 22 carbon atoms.

An additional problem is created when behenate is used. Behenate tends to retard the mouth dispersibility of the frosting composition. Accordingly, there is a need in the edible topping art to provide new and improved fluffy frostings, both in the form of prepared frostings per se and in the form of dry mix products, that overcome the above-described deficiency. Therefore, it is an object of this invention to provide a fluffy frosting composition with excellent heat stability characteristics which does not contain behenate polyglycerol ester.

SUMMARY OF THE INVENTION

The present invention relates to polyglycerol ester fluffy frosting compositions which exhibit excellent heat stability characteristics. The fluffy frosting compositions of this invention contain a mixture of polyglycerol esters which comprise more than 50% stearate and the rest palmitate. In a preferred embodiment of the invention, the amount of stearic acid polyglycerol ester present is from 60% to 85% of the total amount of polyglycerol esters.

DETAILED DESCRIPTION OF THE INVENTION

The characterizing ingredient in the fluffy frosting compositions of the present invention comprises certain polyglycerol esters of fatty acid. These materials are polyglycerol esters containing an average of from about 2 to about 12 glycerol units, and from about 1 to about 4 fatty acid groups per average molecule. The polyglycerol essentially is a polymer which is formed by the dehydration of glycerine. For each unit of glycerine that is added to the polymer chain, there is an increase of one hydroxyl group and, in the practice of this invention, from about 1 to about 4 of these hydroxyl groups of the polyglycerol molecule ester links with stearic acid and palmitic acid.

As with ordinary glycerol or other polyols, polyglycerols can be esterified by reaction with fatty acids. Esterification can take place at any or all of the hydroxyl groups, but generally occurs predominantly at the secondary hydroxyl position, leaving the terminal hydroxyl group unaffected. Depending upon the reaction conditions and the ratio of fatty acid to polyglycerol, the number of secondary hydroxyl groups which are esterified varies. By controlling the balance of esterified to unesterified hydroxyl groups, the lipophilic-hydrophilic balance of the polyglycerol esters can be varied. With an increasing number of esterified hydroxyl groups, the polyglycerol esters become progressively more lipophilic and progressively less hydrophilic. This lipophilic-hydrophilic balance in the polyglycerol ester is important in preparing polyglycerol esters for use in fluffy frostings. It has been found that sufficient lipophilic properties are imparted to the polyglycerol ester by the fatty acid esterification of a single hydroxyl group. However, to maintain sufficient hydrophilic properties in the molecule, the polyglycerol ester cannot contain more than about 4 fatty acid radicals. Preferably, the polyglycerol ester will contain about 3 fatty acid radicals. In this same regard, the polyglycerol ester used in the fluffy frosting compositions of this invention can contain on the average from about 2 to about 12 glycerol units per average molecule, and preferably contains about 3 glycerol units per average molecule.

As was stated above, the fatty acids which are used to make the polyglycerol esters of this invention comprise stearic acid and palmitic acid. Small amounts of other polyglycerol esters can be present such as occurs when the esters are made from naturally occurring fats or oils as discussed below. The stearic acid ester must comprise more than 50% of the total polyglycerol ester mixture, with the balance comprising the palmitic acid ester. When the levels of stearic acid ester and palmitic acid ester are within the above ranges, the frostings of this invention are extremely stable. They can be spread on a cake in peaks, and the peaks remain over a substantial period of storage time. The exceptional stability properties of the fluffy frostings of this invention are directly related to the use of the specified polyglycerol esters in the specified concentration ranges. When other polyglycerol esters are used, the stability advantages are not obtained. If the amount of stearic acid ester is less than about 50% of the total polyglycerol ester mixture, the heat stability characteristics of the frosting are very poor, i.e. the frosting does not hold on the cake. If the amount of palmitic acid ester is not at least about 10% of the total polyglycerol ester mixture, the frosting will be very heat stable, i.e. it will hold on the cake very well, but it will be very difficult if not impossible to whip. In a preferred embodiment of this invention, the amount of stearic acid polyglycerol ester present is from 60% to 85% with the balance comprising palmitic acid polyglycerol ester.

In actual practice polyglycerol esters usually contain a mixture of molecules that average the specified number of glycerol units and fatty acid ester groups per glycerol unit; individual molecules within the mixture can vary from the average. For example, decaglycerol tristearate contains an average of about 10 glycerol units per molecule and an average of about 3 fatty acid ester (stearoyl) groups per molecule while some individual molecules could contain 8, 9, 11, or 12 glycerol units and 2 or 4 fatty acid ester groups. Such mixtures are within the scope of this invention.

Fatty acids per se or naturally occurring fats and oils can serve as the source for the fatty acid component of the polyglycerol ester. The $C_{16}$ and $C_{18}$ fatty acids (palmitic and stearic) can be provided by tallow, soybean oil, or cottonseed oil. When using naturally occurring fats and oils as the fatty acid source, it is preferred that they be substantially completely hydrogenated, e.g., to an I.V. of less than about 10.

The polyglycerol esters can be prepared by conventional direct or interesterification techniques. Suitable methods of forming the specified polyglycerol esters are disclosed by Harris, U.S. Pats. 2,022,766 and 2,023,388, both granted Dec. 3, 1935, and in British Pat. 1,025,265, Apr. 6, 1966. See also Bakers Digest, 37, No. 5, pp. 72–75 (October 1963.

More specifically, for example, an approximately 4:1 mixture of polyglycerol stearate to polyglycerol palmitate can be prepared as follows:

Equipment: 50 lb. reaction vessel

Ingredients:                                            Percent
    Polyglycerol (decaglycerol) _____ 58.0
    Palmitic acid (food grade) _____ 8.4
    Stearic acid _____ 33.3
    Phosphoric acid _____ .3
                                                       ———
                                                       100.00

Conditions:
    Reaction time—2 hours
    Reaction temperature—450° F.
    Atomsphere—nitrogen (sparge)
    Agitation—mechanical and $N_2$ sparge
    Reaction pressure—⅓ atmos.

At the end of two hours or when the concentration of free fatty acid has dropped below 1%, the charge is cooled to 250° F. and held at that temperature for approximately 4 hours under an atmosphere of nitrogen. This allows the reaction mixture to settle out in two phases. The bottom phase contains the unreacted polyglycerol and the top phase contains the mixed fatty acid polyglycerol esters. An effective separation is achieved by draining off the bottom layer of decaglycerol for re-use and collecting the top layer of polyglycerol esters in a separate container.

The fatty acid radicals are randomly distributed on the decaglycerol molecules. The following is a typical fatty acid composition of the polyglycerol esters formed by the described reaction. (Analysis by gas chromatography.)

|   | Percent |
|---|---|
| C–18 oleic | 1.81 |
| C–18 stearic | 77.48 |
| C–16 palmitic | 20.48 |
| C–14 myristic | 0.16 |
| C–12 lauric | 0.07 |
|   | 100.00 |

This invention provides fluffy frosting compositions based on the above-described polyglycerol esters, which usually comprise from 1% to 10% by weight of the total dry ingredients. As with conventional fluffy frostings, water is a component of the composition when it exists in final form ready for using and eating. Thus, the polyglycerol ester can be added to water (preferably with sufficient heating to at least partially dissolve the polyglycerol ester) and the water-polyglycerol ester blend can then be whipped to form an aerated, aqueous fluffy frosting suitable for spreading, filling, and/or eating. In terms of foaming/aerating properties and stability, the fluffy frosting need only contain the specified polyglycerol ester and water. However, in order to provide a product with desired eating characteristics, additional ingredients can be combined with the polyglycerol ester either before or after the addition of water. Thus, a sweetening agent, for example, sugar or an artificial sweetener, is preferably combined with the polyglycerol ester in the preparation of an aerated, aqueous fluffy frosting.

The sweetening agent preferably included in the fluffy frosting compositions of this invention can be any suitable sugar such as sucrose, dextrose lactose, glucose, galactose, and the like or mixtures thereof. These materials can be used in such conventional forms as cane sugar, beet sugar, corn syrup, brown sugar, maple sugar, maple syrup, honey, molasses, and invert sugar. Sucrose and/or dextrose are preferred sweetening agents. In place of all or part of the above-described sugars, artificial sweeteners such as saccharin can be employed. A minor amount of salt can be added and any conventional flavor material can also be added to the fluffy frosting composition. For example, vanilla, vanillin, chocolate, fruits and fruit extracts, nuts, and the like can be used as desired.

Conventional foaming/aerating agents for fluffy frostings can be added to the compositions of this invention, but they are not required and are preferably omitted. These agents most often are protein or protein-containing materials such as whole milk, nonfat milk solids, soy protein, egg white, egg yolk, and egg albumen. Conventional thickening agents for fluffy forstings can also be added to the compositions of this invention to affect eating characteristics such as mouth feel, but are not required for stabilization. Among these agents are gums such as carrageenan, tragacanth, arabic and ghatti; seaweed colloids such as agar, carrageen and sodium alginate; seed extracts such as locust bean and guar; water-dispersible cellulose derivatives such as sodium carboxymethyl cellulose; starch; and gelatin. Shortening is often an ingredient of socalled creamy-type frostings but is often not present in fluffy frostings. In the particular polyglycerol ester-based fluffy frosting compositions of the present invention, shortening may be added or omitted from the formulation. Shortening or other fat, particularly in liquid form, can decrease the foaming/aerating properties of the polyglycerol ester-based fluffy frosting compositions of the present invention.

The fluffy frosting compositions of this invention can be prepared and made available to consumers in a variety of forms. For example, a liquid frosting composition comprising a suitable polyglycerol ester and sugar can be mixed with water and packaged in a suitable container. The user then merely whips the liquid composition to incorporate air. More preferably, the liquid frosting composition can be whipped to form an aerated, aqueous frosting that is ready to spread and/or eat. Such "prepared frostings" can be packaged in suitable containers, e.g. a sterilized airtight can, and then distributed in this form to be used by consumers without further preparation.

Alternatively, a fluffy frosting composition comprising a suitable polyglycerol ester, sugar, and water can be placed in a pressure-dispensing container from which it can be removed in aerated form. The propellant for the pressure container can be any conventional non-toxic, odorless, tasteless gas including nitrogen, nitrous oxide, carbon dioxide, dichloro-difluoromethane (Freon), and the like. These containers, conventionally known as aerosol dispensers, can have a dispensing orifice of about 0.03" in diameter or less and the frosting is able to pass therethrough and be whipped during such passage.

In a preferred embodiment of the invention, the fluffy frosting composition based on the above-described polyglycerol ester is prepared and packaged in the form of a dry mix. Thus, the consumer adds water to the mix and then whips it into an aqueous, aerated fluffy frosting for use. A dry mix based on the polyglycerol ester per se is not desirable since the specific polyglycerol esters suitable for use herein exist in the form of hard, brittle waxy solids. However, dry granular ingredients, preferably sugar, can be blended with the polyglycerol ester to provide a dry, prepared mix. The term "drymix" is not intended to totally exclude moisture as the mixes disclosed herein can include minor amounts, e.g., up to about 10%, of water.

Highly preferred dry mixes can be prepared by combining the polyglycerol ester with an aliphatic polyhydric alcohol carrier. This method is described in commonly assigned, copending application, Ser. No. 711,862, filed Mar. 11, 1968, and now U.S. Pat. 3,592,663. Two other highly preferred methods for making dry prepared fluffy frosting mixes are disclosed in the commonly assigned, copending applications: "Process for Producing Polyglycerol Ester Fluffy Frosting Mixes" by Paul Seiden, Ser. No. 128,157, U.S. Pat. 3,726,691, filed Mar. 25, 1971, and "Dry Prepared Fluffy Frosting Mixes," by Ronald D. Harris and Richard M. Roudebush, Ser. No. 128,159, filed Mar. 25, 1971 and now abandoned.

When the fluffy frosting compositions are prepared in the form of a dry mix they require only the addition of water and beating in a bowl to yield within a few minutes a highly aerated, aqueous fluffy frosting with a smooth viscous texture. For example, mixing in a conventional household electric mixer for a period of less than ten minutes is sufficient to whip the composition into an aerated fluffy frosting. The compositions tend to reach minimum density faster, e.g., they reach minimum density in less than about 3 minutes, than do conventional fluffy frostings when mixed in a household electric mixer. Additional mixing, e.g., for 1 to 5 minutes beyond this point, is desirable to assure uniformity.

The aerated, aqueous, fluffy frostings prepared from the compositions of this invention have a smooth viscous texture at least comparable to commercial products and an aerated structure superior thereto in terms of density and stability. Frostings of increased stability and acceptable from every standpoint, particularly in respect to their chiffon-like or fluffy mouth-feel, are provided by the invention.

The fluffy frosting compositions disclosed herein are economical to use and have a particular advantage in this respect in that substantially more volume of frosting can be obtained from a given weight of ingredients than with conventional fluffy frostings because of the high aeration properties and corresponding low density of the frostings of this invention.

The frostings of the invention are more aerated than conventional fluffy frostings as indicated by their density which is generally less than about 0.3 gm./cc. Because of the high level of air which they contain, the frostings have a very desirable glossy-type appearance. The frostings of the invention are extremely stable; for example, they can be spread on a cake in peaks and the peaks remain over substantial periods of storage time. Moreover, the icings do not have a tendency to leak, i.e., lose liquid upon storage. Further, the frostings do not change in appearance or eating quality upon storage. The exceptional stability properties of the fluffy frostings discussed above are directly related to use of the specified polyglycerol esters in the specified amounts. When polyglycerol esters not meeting this requirement are substituted for the specified polyglycerol esters, the stability advantages are not obtained.

The following example is meant only to illustrate the invention and not to limit it in any way.

EXAMPLE

The following example demonstrates how different levels of stearate and palmitate in the polyglycerol ester affect the storage stability of polyglycerol ester fluffy frostings. Two decaglycerol esters were blended together to make the ratios of stearate to palmitate shown in Table I. Both of these esters had an average of 3.5 fatty acid radicals per molecule of decaglycerol. The decaglycerol esters were melted together in the various proportions, cooled, and pulverized with an equal amount of dextrose in an impact mill. This pulverized mixture was then incorporated into the dry mix frosting formula indicated below. The dry mix was impact milled again to insure adequate dispersion of the decaglycerol esters.

| Ingredient: | Percent |
|---|---|
| Sucrose | 60.465 |
| Dextrose | 29.095 |
| Salt | 0.48 |
| Gelatin | 1.0 |
| Artificial vanilla | 0.94 |
| Artificial almond flavor | 0.02 |
| Pulverized mixture of polyglycerol esters and dextrose (50–50) | 8.0 |
| | 100.00 |

The mixes were then made into fluffy frostings by adding 120 grams of hot water (180° F. to 200° F.) to 128 grams of the dry frosting mix and whipping in a standard home-type mixer. Table I shows the densities and relative viscosities of the fluffy frostings immediately after whipping. Mixes containing higher percentages of palmitate whipped faster and achieved a lower density, but were less stable when stored at 90° F. overnight. In fact, the 100% palmitate mix started to deaerate while the frosting was being applied to the cake. The 100% palmitate frosting also had a very poor appearance after overnight storage at 90° F. Frosting mixes containing 100% stearate were very difficult to whip. It took as long as 16 minutes to achieve satsfactory aeration.

TABLE I

| Percent | | Density (g./cc.) | Relative viscosity [1] | Stability overnight on cake |
|---|---|---|---|---|
| Palmitate | Stearate | | | |
| 0 | 100 | 0.22 | 25 | Poor. |
| 10 | 90 | 0.22 | 24 | Very good. |
| 20 | 80 | 0.19 | 25 | Excellent. |
| 35 | 65 | 0.21 | 22 | Do. |
| 50 | 50 | 0.20 | 23 | Poor. |
| 75 | 25 | 0.19 | 26 | Do. |
| 80 | 20 | 0.19 | 26 | Do. |
| 100 | 0 | 0.27 | 21 | Very poor. |

[1] The viscosity measurement is performed on a Brookfield viscometer using a size D "T-bar" spindle.

Acceptable storage stability is obtained with levels of stearate of greater than 50%. For optimum whip time, eating quality, and storage stability, the amount of stearate should be from 75% to 80%.

Although the mixture of polyglycerol esters used here was obtained by blending the two decaglycerol esters, the same results can be achieved by using mixture of polyglycerol esters obtained by interesterification of the correct blend of fatty acids with decaglycerol or another suitable polyglycerol.

What is claimed is:

1. A polyglycerol ester fluffy frosting composition which exhibits excellent heat stability characteristics and which is comprised of a sweetening agent, flavorings, and a mixture of polyglycerol esters comprising stearic acid polyglycerol ester and palmitic acid polyglycerol ester wherein the amount of stearic acid polyglycerol ester is greater than 50% of the total polyglycerol ester mixture and the amount of palmitic acid polyglycerol ester is at least 10% of the total polyglycerol ester mixture, said total polyglycerol ester mixture comprising from about 1% to about 10% of the total dry ingredients and wherein said polyglycerol esters contain an average of from about 2 to about 12 glycerol units and an average of from about 1 to about 4 fatty acid groups per average molecule.

2. The composition of claim 1 wherein the amount of stearic acid polyglycerol ester is from about 6% to about 85% of the total polyglycerol ester mixture.

3. The composition of claim 2 wherein the sweetening agent is selected from the group consisting of sucrose and dextrose.

4. A dry prepared fluffy frosting mix comprising a sweeting agent, flavorings, and a mixture of polyglycerol esters comprising stearic acid polyglycerol ester and palmitic acid polyglycerol ester wherein the amount of stearic acid polyglycerol ester is greater than 50% of the total polyglycerol ester mixture and the amount of palmitic acid polyglycerol ester is at least 10% of the total polyglycerol ester mixture, said total polyglycerol ester mixture comprising from about 1% to about 10% of the total dry ingredients and wherein said polyglycerol esters contain an average of from about 2 to about 12 glycerol units and an average of from about 1 to about 4 fatty acid groups per average molecule.

5. The dried prepared mix of claim 4 wherein the amount of stearic acid polyglycerol ester is from about 60% to about 85% of the total polyglycerol ester mixture.

References Cited

UNITED STATES PATENTS 3,592,663   7/1971   Branner et al _____ 99—139

RAYMOND N. JONES, Primary Examiner

J. M. HUNTER, Assistant Examiner

UNITED STATES PATENT OFFICE
CERTIFICATE OF CORRECTION

Patent No. 3,803,333      Dated April 9, 1974

Inventor(s) Richard Morris Roudebush

It is certified that error appears in the above-identified patent and that said Letters Patent are hereby corrected as shown below:

Column 5, line 42      "U.S. Pat. 3,726,691, filed March 25, 1971" should read -- filed March 25, 1971, U.S. Patent 3,726,691 --.

Column 7, line 26      "6%" should read -- 60% --.

Signed and sealed this 27th day of August 1974.

(SEAL)
Attest:

McCOY M. GIBSON, JR.
Attesting Officer

C. MARSHALL DANN
Commissioner of Patents